Patented May 30, 1933

1,911,699

UNITED STATES PATENT OFFICE

OTTO LIMPACH, OF WIESBADEN-BIEBRICH, KARL HAGER, OF FRANKFORT-ON-THE-MAIN, AND ALBERT SCHMELZER AND FRITZ BALLAUF, OF COLOGNE-MUHLHEIM, GERMANY, ASSIGNORS TO GENERAL ANILINE WORKS, INC., OF NEW YORK, N. Y., A CORPORATION OF DELAWARE

NEW HYDROXYBENZOCARBAZOLES AND A PROCESS OF PREPARING THEM

No Drawing. Application filed April 20, 1931, Serial No. 531,614, and in Germany April 30, 1930.

The present invention relates to new hydroxybenzocarbazoles and a process of preparing them.

We have found that hydroxybenzocarbazoles are obtainable with an excellent yield by heating with an arylhydrazine in the presence of a mineral acid an addition compound obtainable by causing bisulfite to act upon an $\alpha$-$\beta$-dihydroxynaphthalene compound containing one hydroxy group in each nucleus.

Throughout the specification and claims the positions in the carbazole compounds are numbered according to the following system:

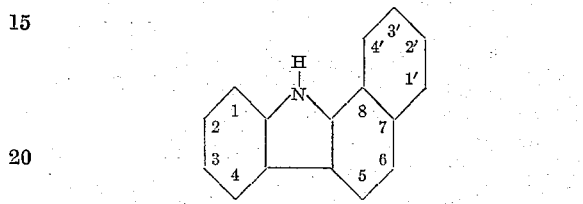

which compound is named a 7.8-benzocarbazole.

By using, for instance, 1.6-dihydroxynaphthalene, there is obtained in a uniform manner and with a very good yield the 2'-hydroxy-7.8-benzocarbazole. The formation of an isomeric hydroxybenzocarbazole which, according to the theory, would be possible on account of the second hydroxy group of the 1.6-dihydroxy-naphthalene could not be ascertained. When using 1.7-dihydroxynaphthalene, 3'-hydroxy-7.8-benzocarbazole is formed.

The reaction of $\alpha$-$\beta$-dihydroxynaphthalenes or their substitution products with arylhydrazines may be largely varied inasmuch as not only phenylhydrazine or naphthylhydrazine may be used but also all the asymmetrical substituted aryl- and alkylhydrazines.

According to the present process new products are obtainable which may be characterized by the following general formula:

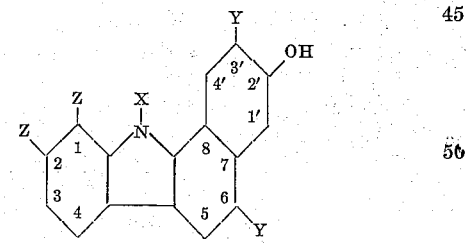

wherein X stands for hydrogen or an alkyl group, the Y's represent hydrogen or halogen, and the Z's stand for hydrogen or jointly represent a benzene nucleus attached to the positions 1 and 2.

The hydroxybenzocarbazoles obtainable according to the present process, especially 2'-hydroxy-7.8-benzocarbazole as well as 3'-hydroxy-7.8-benzocarbazole and 5-hydroxy-7.8-benzocarbazole, their homologues and analogues are valuable intermediate products for the manufacture of azo-dyestuffs in substance or on the fiber. They are distinguished by very good fastness properties and especially deep tints.

The following examples serve to illustrate the invention, but they are not intended to limit it thereto, the parts being by weight:

(1) 160 parts of 1.6-dihydroxynaphthalene are boiled for 5 hours with 1000 parts of a bisulfite solution of 40% strength and 200 parts of water. Thereupon, 160 parts of phenylhydrazine hydrochloride are added and such a quantity of sulfuric acid of 60° Bé. as is necessary to bring about an acid reaction towards Congo and the whole is boiled for 8 hours with a 10% excess of sulfuric acid. The solution is filtered with suction, and the solid matter is washed until neutral. There is obtained with a very good yield and in a great purity 2'-hydroxy-7.8- benzocarbazole. The new compound of the formula:

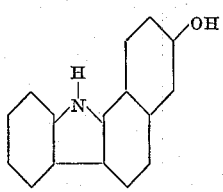

a light-gray fine crystalline powder, melts after recrystallization from dichlorobenzene at 263° C. and dissolves in alcohol, ether and acetone. It is scarcely soluble in glacial acetic acid, benzene, toluene, xylene and chlorobenzene and is insoluble in water and ligroin.

(2) 160 parts of 1.6-dihydroxynaphthalene are boiled for 3 hours with 1500 parts of bisulfite of 40% strength. Thereupon, 180 parts of asymmetrical N-methyl-phenylhydrazine hydrochloride are added and such a quantity of sulfuric acid of 60° Bé. as is necessary to bring about an acid reaction towards Congo; the whole is boiled for 6 hours with a 10% excess of sulfuric acid. The solution is filtered with suction, and the solid matter is washed until neutral and dried. There is obtained with a good yield the N-methyl-2′-hydroxy-7.8-benzocarbazole of the following formula:

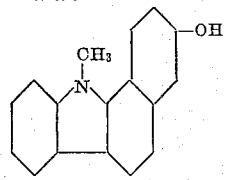

It forms a light-gray fine crystalline powder which melts, after recrystallization from dichlorobenzene, at 218° C. The new compound is easily soluble in alcohol, acetone and ether, but difficultly soluble in hydrocarbons.

(3) 300 parts of 4.7-dibromo-1.6-dihydroxynaphthalene are boiled for 5 hours with 1200 parts of a bisulfite solution of 40% strength. There are then added 160 parts of phenylhydrazine hydrochloride and such a quantity of sulfuric acid of 60° Bé. as is necessary to bring about an acid reaction towards Congo; the whole is boiled for 8 hours with a 10% excess of sulfuric acid. The solution is filtered with suction, and the solid matter is washed until neutral. There is obtained with a good yield the 2′-hydroxy-3′.6-dibromo-7.8-benzocarbazole of the following formula:

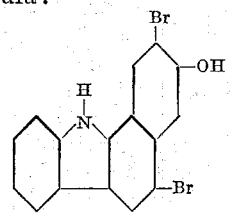

It forms a light-pink fine crystalline powder which is difficultly soluble in hydrocarbons, easily soluble in alcohol and glacial acetic acid. When recrystallized from alcohol it melts at 222° C.

(4) 160 parts of 1.6-dihydroxynaphthalene are boiled for 4 hours with 1200 parts of a bisulfite solution of 40% strength. There are then added 250 parts of 5-chlornaphthylhydrazine hydrochloride and such a quantity of sulfuric acid of 60° Bé. as is necessary to bring about an acid reaction towards Congo; the whole is boiled for 8 hours with a 10% excess of sulfuric acid. The solution is filtered with suction, and the solid matter is washed until neutral. There is obtained with a good yield the 2′-hydroxy-1.2.7.8-dibenzo-1″-chlorocarbazole of the following formula:

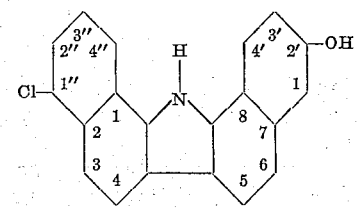

The new compound forms a light-gray fine crystalline powder which easily dissolves in alcohol, ether and acetone and difficultly dissolves in hydrocarbons. After being twice recrystallized from trichlorobenzene it melts at 273–275° C.

(5) 160 parts of 1.7-dihydroxynaphthalene are boiled for 5 hours with 1000 parts of a bisulfite solution of 40% strength and 200 parts of water. There are then added 160 parts of phenylhydrazine hydrochloride and such a quantity of sulfuric acid of 60° Bé. as is necessary for bringing about an acid reaction towards Congo; the whole is boiled for 8 hours with a 10% excess of sulfuric acid. The solution is filtered with suction, and the solid matter is washed until neutral. There is obtained with a very good yield and in a great purity the 3′-hydroxy-7.8-benzocarbazole of the formula:

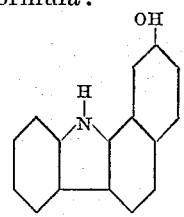

It forms a light-gray fine crystalline powder, melts after recrystallization from toluene, at 248–250° C.; it is easily soluble in alcohol, difficultly soluble in hydrocarbons and insoluble in water and ligroin.

(6) 20 parts of 1.7-dihydroxynaphthalene and 150 parts of sodium bisulfite of 33° Bé. are boiled for 6–8 hours. A hydrochloric acid solution of N-ethyl-para-methylphenylhydrazine is added thereto. The solution is rendered acid and decomposed on the water bath. There is obtained with a very good yield the 3-methyl-N-ethyl-3'-hydroxy-7.8-benzocarbazole melting at 166–167° C. It forms silver laminae which easily dissolve in warm toluene and, on cooling, crystallize out. It has the formula:

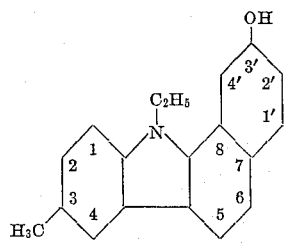

We claim:

1. The process which comprises heating an α- β- dihydroxynaphthalene compound containing one hydroxy group in each nucleus, with a bisulfite solution and further heating the bisulfite addition compound thus obtained with an arylhydrazine in the presence of a strong mineral acid.

2. The process which comprises heating a 1.6-dihydroxynaphthalene compound with a bisulfite solution and further heating the bisulfite addition compound thus obtained with an arylhydrazine in the presence of a strong mineral acid.

3. The process which comprises heating a 1.6-dihydroxynaphthalene compound with a bisulfite solution and further heating the bisulfite addition compound thus obtained with an arylhydrazine in the presence of sulfuric acid.

4. The process which comprises heating 1.6-dihydroxynaphthalene with a bisulfite solution and further heating the bisulfite addition compound thus obtained with phenylhydrazine in the presence of sulfuric acid.

5. The process which comprises heating 1.7-dihydroxynaphthalene with a bisulfite solution and further heating the bisulfite addition compound thus obtained with phenylhydrazine in the presence of sulfuric acid.

6. As a new product, the compound of the following formula:

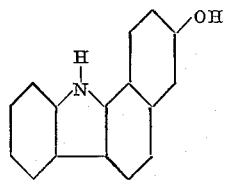

said product forming a light-gray fine crystalline powder, melting after recrystallization from dichlorobenzene at 263° C. and dissolving in alcohol, ether and acetone, difficultly dissolving in glacial acetic acid, benzene, toluene, xylene and chlorobenzene and being insoluble in water and ligroin.

7. As a new product, the compound of the following formula:

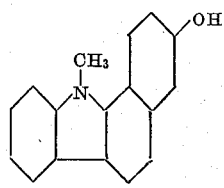

forming a light-gray fine crystalline powder, melting after recrystallization from dichlorobenzene at 218° C., being easily soluble in alcohol, acetone and ether and difficultly soluble in hydrocarbons.

8. As a new product, the compound of the following formula:

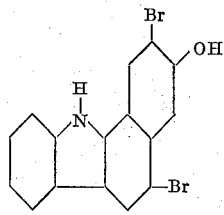

forming a light-pink, fine crystalline powder, difficultly soluble in hydrocarbons, easily soluble in alcohol and glacial acetic acid and melting after recrystallization from alcohol at 222° C.

9. As new products, the compounds of the general formula:

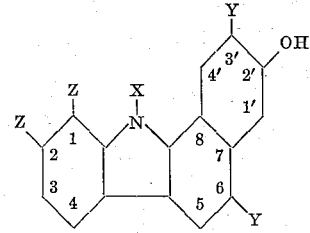

wherein X stands for hydrogen or alkyl, the Y's represent hydrogen or halogen and the Z's stand for hydrogen or jointly represent a benzene nucleus attached to the positions 1 and 2.

10. As new products, the compounds of the formula:

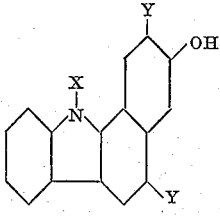

wherein X stands for halogen or alkyl, and the Y's represent hydrogen or bromine.

In testimony whereof, we affix our signatures.

OTTO LIMPACH.
KARL HAGER.
ALBERT SCHMELZER.
FRITZ BALLAUF.